(12) United States Patent
Wilson

(10) Patent No.: US 6,264,216 B1
(45) Date of Patent: Jul. 24, 2001

(54) MULTI-PURPOSE CART

(76) Inventor: Carol Wilson, 3041 Peel Ave., Orlando, FL (US) 32806

( * ) Notice: Subject to any disclaimer, the term of this patent is extended or adjusted under 35 U.S.C. 154(b) by 0 days.

(21) Appl. No.: 09/505,246

(22) Filed: Feb. 15, 2000

(51) Int. Cl.[7] .................................................. B62B 1/12
(52) U.S. Cl. .................... 280/30; 280/47.25; 280/47.33; 297/17
(58) Field of Search .................. 297/17, 188.1, 297/377; 280/30, 47.25, 47.26, 408, 47.33, 47.35, 47.4, 652, 47.18

(56) References Cited

U.S. PATENT DOCUMENTS

| | | | |
|---|---|---|---|
| 2,592,912 | * | 4/1952 | Knipper .................................. 297/17 |
| 3,873,114 | * | 3/1975 | Brown ..................................... 280/30 |
| 3,947,903 | * | 4/1976 | Menke .................................... 297/17 |
| 4,114,914 | | 9/1978 | Cohen .................................... 280/30 |
| 4,527,829 | * | 7/1985 | Fanslau et al. ......................... 297/17 |
| 4,742,900 | * | 5/1988 | Boxhammer ........................... 297/17 |
| 5,269,157 | * | 12/1993 | Ciminelli et al. ................. 280/47.18 |
| 5,299,337 | * | 4/1994 | Vneza ..................................... 297/17 |
| 5,653,458 | | 8/1997 | Chaparian .............................. 280/30 |
| 5,727,844 | * | 3/1998 | O'Quinn et al. ....................... 297/17 |

* cited by examiner

*Primary Examiner*—Michael Mar
(74) *Attorney, Agent, or Firm*—Carnes Cona & Dixon

(57) ABSTRACT

The present invention is a multi-purpose cart device having wheels and including a first section and a second section. Each section includes a hollow interior area that can be used for storing and maintaining any desired items. The sections can be fabricated from insulating material to allow for each section to act as a cooler. Each section further includes a mechanism for enabling it to convert to a chair when desired. Located between each section is a foldable and collapsible table. The final product is a cart that is beneficial, advantageous, and one, which will simplify and minimize the process of carrying and taking items to a recreational event.

9 Claims, 7 Drawing Sheets

MULTI-PURPOSE CART

BACKGROUND OF THE INVENTION

1. Field of the Invention

The present invention relates generally to a multi-purpose cart and more particularly to a multi-purpose cart that can store and transport a multiplicity of items and which can easily, quickly and efficiently convert into a table and chairs, to inherently provide a device ideally suited for use on a beach, at a picnic, during a social and/or public gathering/event or the like.

2. Description of the Prior Art

Recreational activities are enjoyed by many. However, many of these activities require additional items to be brought along for further enhancing the particular event. For example, many have found that to luxuriate in a day at the beach, one must bring along items which are deemed a necessity, such as towels, umbrellas, coolers, suntan lotion, and the like. These items can and tend to be bulky and cumbersome to carry and bring to the beach. Accordingly, efforts have been made to render a more efficient means of carrying items for any recreational activity. These efforts have provided for a plurality of carts to be assembled in the hopes of aiding and assisting the participants of the particular recreational activity. In addition, these devices have further been embellished by providing additional features to consequently provide a cart which is versatile and user friendly.

One such device is disclosed in U.S. Pat. No. 5,653,458 issued to Chaparian. In this patent there is disclosed a recreation cart which is used for transporting recreational paraphernalia and that can be converted into a utility surface, such as table. Though useful, this device is limited in its options for the consumer. In addition, in order to utilize the cart as a utility surface, the entire cart must be empty. This can pose a situation which is inconvenient and undesirable by the user.

Another device is disclosed in U.S. Pat. No. 4,114,914 issued to Cohen. In this patent there is disclosed a cart which is folded to provide for the device to act as a carrying means and then converted into a chair, when in a folded position. Though somewhat efficient, this device does suffer some shortcomings. One shortcoming is that the device is fabricated from a webbing material. This material is flimsy and not structurally sound, and as such this cart will be incapable of carrying many items which are deemed necessary, such as a filled cooler. Further, the webbing will inherently include apertures, which in an invitation for small items, such as suntan lotion, toys, or the like, to fall therebetween. An issue undesirable by the consumer.

Hence, as seen what is needed is an apparatus, which will act as a cart for adequately, and effectively carrying a multiplicity of items as well as provide for an alternative use, such as converting to a chair and/or table. The conversion process would be accomplished easily and quickly so as to provide an apparatus which is user friendly. In addition, it is desirable that the conversion takes place without removing any of the items stored and carried on the cart. Such an apparatus should be versatile and simple in construction so as to provide a device that is successful in use for any individual regardless of age, physics and dexterity can use that.

Accordingly, it is seen that none of these previous efforts provide the benefits intended with the present invention, such as identified above. Additionally, prior techniques do not suggest the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a multi-purpose cart device that is designed and configured to carry a multiplicity of items and then can be converted into chairs, a utility surface, or a combination of chairs and a utility surface. This will provide for a final product that is beneficial, advantageous, and one, which will simplify and minimize the process of carrying and taking items to a recreational event.

To enable such an apparatus, the cart of the present invention comprises a front portion, a rear portion and a center section sandwiched therebetween. In summary, the front and rear portions will constitute the seat assembly when converted, while the center section can be transformed into a utility surface, such as a table. When assembled, in the non-converted stage, the cart will enable adequate transportation of a multiplicity of items, via a transportation means, as is conventionally known.

Hence, each portion, front and rear, includes a frame or chassis member. The member includes a wheel assembly secured thereto and a container body. A lid, hingedly secured thereto, is used as a seat and when lifted, exposes the container body for storing items. The front portion of the frame or chassis member is removably secured to rear portion of the frame or chassis member via a simple removing means. This removing means will allow for the sections to be separated, and thus permit for the sections to act as chairs and to be located in any desirable location, as deemed necessary by the user. For added safety, locks, stabilizers, or a combination thereof, can be located on each wheel assembly for locking and, intrinsically, stabilizing the device, whether being used as a cart or as chairs, in a fixed and secured position. In this configuration, items need not be removed from each portion in order to successfully utilize the device as either a seat or a cart.

To further enhance the multi-purpose cart of the present invention, at least one section, preferably both, can be fabricated from material possessing insulating properties, so as to enable at least one compartment or preferably both to act as a cooler. In addition, these compartments also may be used for dry storage. Alternatively, pockets or the like can be located on the circumference, or side walls, of one or each portion, so as to add extra storage for miscellaneous and small items. Further, a holding means, specifically designed for elongated items or shafts, such as an umbrella, fishing rods, or the like, can be located along the sides of each compartment for adequately transporting and storing these awkward items. For easy clean-up and/or drainage, each compartment is designed with a drain plug.

The lid of one or each compartment can include an optional design, wherein a back, which folds upwardly, is provided and which can be altered angularly. Further, a front can be provided, which folds downwardly, and can be altered angularly. The back will provide for a backrest to exist while the front will provide for a leg rests to exist. This configuration will provide for a lounge like structure and a more comfortable and desirable chair.

Sandwiched between the front and rear portions is the center section. This center section removably receives a foldable table. The table includes foldable legs, which are telescopic in structure, so as to provide for a final product which is completely compact and efficient. The use of telescopic legs enables the user to select the desired height when utilizing the table.

To further assists the user, a handle is either permanently secured, or optionally, removably secured to the front portion of the apparatus of the present invention This will permit conventional utility of the cart and allow the user to easily and efficiently push or pull the apparatus of the present invention when used as a cart. In the removable embodiment, the side of the handle can include a plurality of circular members which can be individually used as drink holders.

Accordingly, it is the object of the present invention to provide for a multi-purpose cart assembly which will overcome the deficiencies, shortcomings, and drawbacks of prior cart assemblies and methods thereof.

Another object of the present invention is to provide for a multi-purpose cart assembly which meets the needs and desires of the consumer, and one which is simple to use and which can carry a multiplicity of items adequately and efficiently.

Still another object of the present invention is to provide for a multi-purpose cart assembly that provides comfortable seats as well as provide storage capability for awkward and odd sized items.

A further object of the present invention, to be specifically enumerated herein, is to provide a multi-purpose cart assembly in accordance with the preceding objects and which will conform to conventional forms of manufacture, be of simple construction and easy to use so as to provide a device that would be economically feasible, long lasting and relatively trouble free in operation.

Although there have been many inventions related to convertible carts, none of the inventions have become sufficiently compact, low cost, versatile, desirable and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
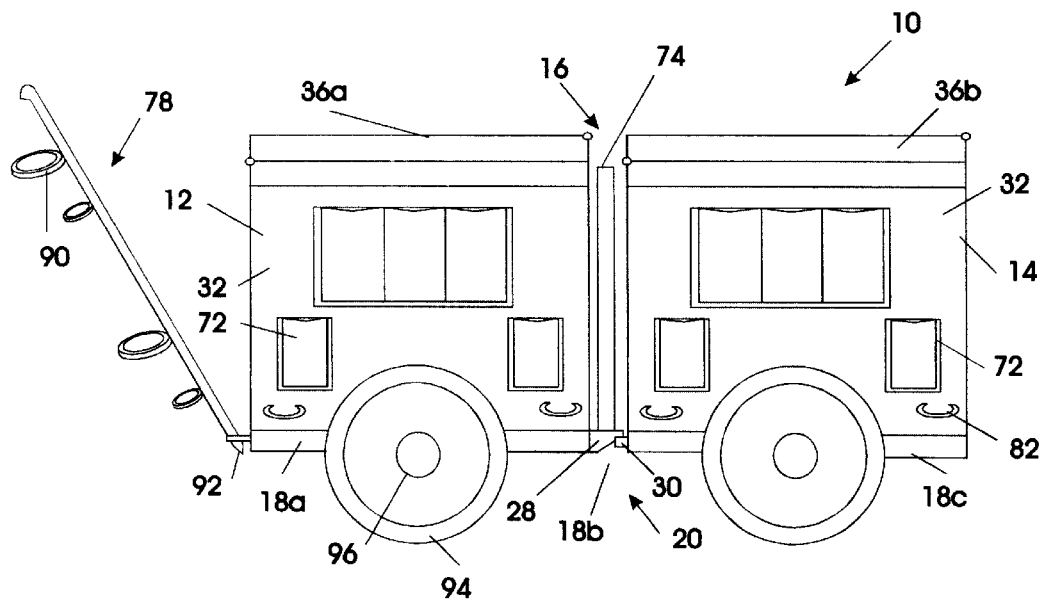
FIG. 1 is a front side view of the multi-purpose cart apparatus of the present invention in an attached form ready for use in the transportation mode.

As seen in the drawings, in particular to FIGS. 1–12, the present invention, a multi-purpose cart apparatus, generally denoted by reference numeral 10, will be described. As seen in these drawings, the multi-purpose cart apparatus is designed and configured to adequately and efficiently carry a multiplicity of items, regardless of their size, shape and structure. To add to the convenience, this cart further includes wheels that enable travel along any type of terrain, including, but not limited to sand, mud, grass, or the like. Innately providing a cart which is ideally suited for the beach, park, picnicking, fishing, any type of recreational activity or the like.

As illustrated, the multi-purpose cart apparatus includes a first portion or first section 12, a second portion or second section 14, and a center portion or center section 16 sandwiched therebetween. The first and second sections 12 and 14, will constitute a seat assembly when converted and act as a storage means when in either the converted and non-converted state. The center section 16 can be transformed into a utility surface, such as a table.

Each section, the first section 12, center section 16, and second section 14, includes a frame or chassis member 18a, 18b, and 18c, respectively. The first section 12 is removably secured to second section 14 via a removing mechanism located in the center frame 18b of the center section 16. Providing separation to occur via the center of the apparatus.

Figure 2:
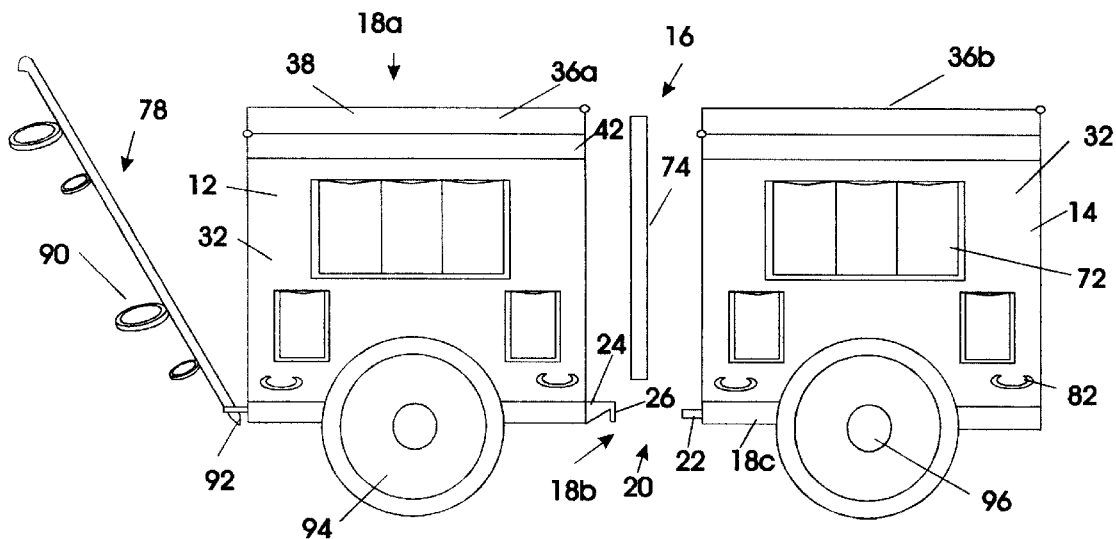
FIG. 2 is a front side view of the multi-purpose cart apparatus of the present invention in a disassembled formed, ready for use in the stationary mode.

In a first embodiment of the removing mechanism 20, as seen in FIG. 2, the center frame 18b includes an aperture located within a flange extension 22. This flange extension 22 extends outwardly from and is secured to the chassis member 18c of the second section 14. A second flange extension 24, having a hook member 26 attached thereto, extends outwardly from and is secured to the chassis member 18a of the first section 12. In this arrangement, the hook member is inserted into the hole of the flange extension 22 for providing the first, second and center sections to be in a secured and attached position. Removing the hook member 24 from the aperture of the flange extension 22 provides for the first section to be separated from the second section. This also provides for the central section to be disassembled.

Figure 9:
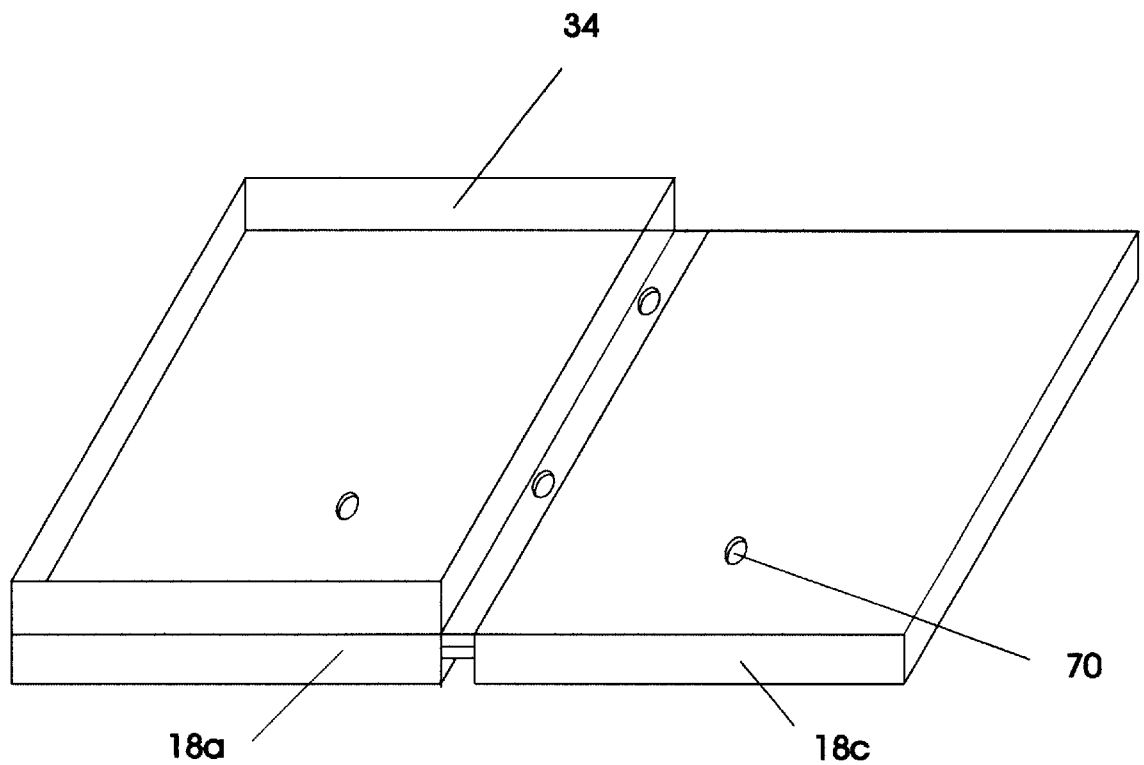
FIG. 9 is a perspective view of a the chassis which holds and maintains each portion of the multi-purpose cart apparatus of the present invention in an extended position for use as a chair.
Figure 10:
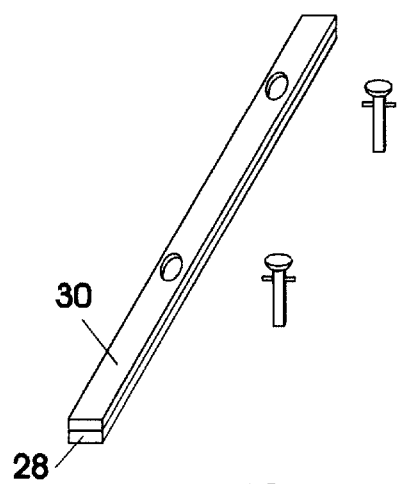
FIG. 10 is a perspective view of the connecting frame which connects the first portion to the second portion.

In an alternative embodiment, as seen in FIGS. 1, 9 and 10, the removing mechanism comprises a first flange 28 and a second flange 30. Each flange has at least one opening (illustrated, but not labeled) extending therethrough. The first flange extends outwardly and from the back of frame 18a of the first portion 12 and the second flange 30 extends outwardly and from the front of the frame 18c of the second portion 14. In this embodiment, the second flange (or first flange) is located above the first flange (or second flange). This will provide for the flanges to be in a stacked position to render the openings to be aligned with each other. Once aligned, removable bolts or the like can be inserted therein or removed therefrom for securing (bolts inserted therein) or removing (bolts removed therefrom) the first portion from the second portion.

Figure 3:
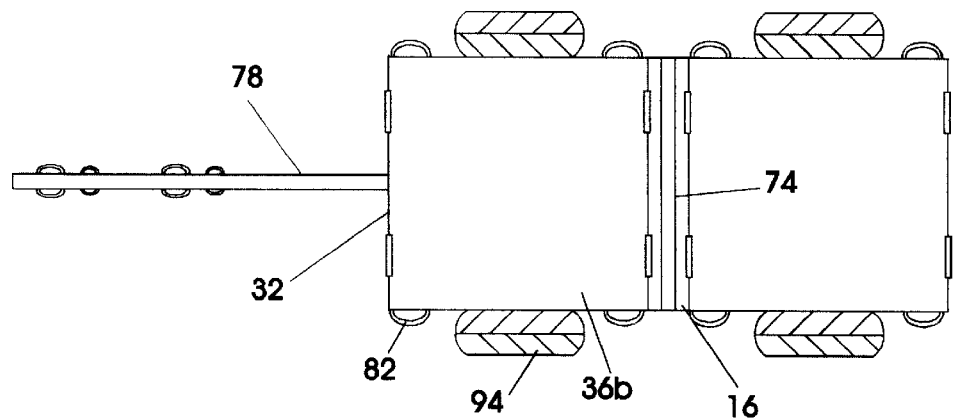
FIG. 3 is a top plan view of the multi-purpose cart apparatus of the present invention in an attachment formed ready for use in the transportation mode.

FIGS. 1 and 3 illustrate two examples of options that can be used for attaching and disassembling the first section to the second section. However, it is to be understood that this removing mechanism is merely a conventional feature and that it can be changed within the scope of the present invention, to any type or style of attaching and removing mechanism which is conventionally known and used in the industry, and as deemed necessary by the manufacturer and/or consumer.

Removing the first section 12 and second section 14 provides for these sections to act as separate and independent entities. This will enable the user to utilize the sections as believed to be necessary.

As seen in FIGS. 1–5, the first portion and second portion each include a container body 32. This container can be either permanently secured to the frame or optionally can be removably secured to the frame member. To enable removable attachment, conventional means are utilized. An example of a conventional means is illustrated in FIG. 9. As seen in this figure, the frame member can include side walls 34. These side walls form a natural cup for sufficiently receiving and maintaining the particular container body 32. Other removably means include the use of bolts, hook and loop material (VELCRO), snapping devices, straps, or the like. Optionally, one or both of the containers can be removably secured to the frame to allow for the container to be used separately and independently from other features and components of the present invention. This will provide for each container body to act as a separate entity.

Figure 4A:
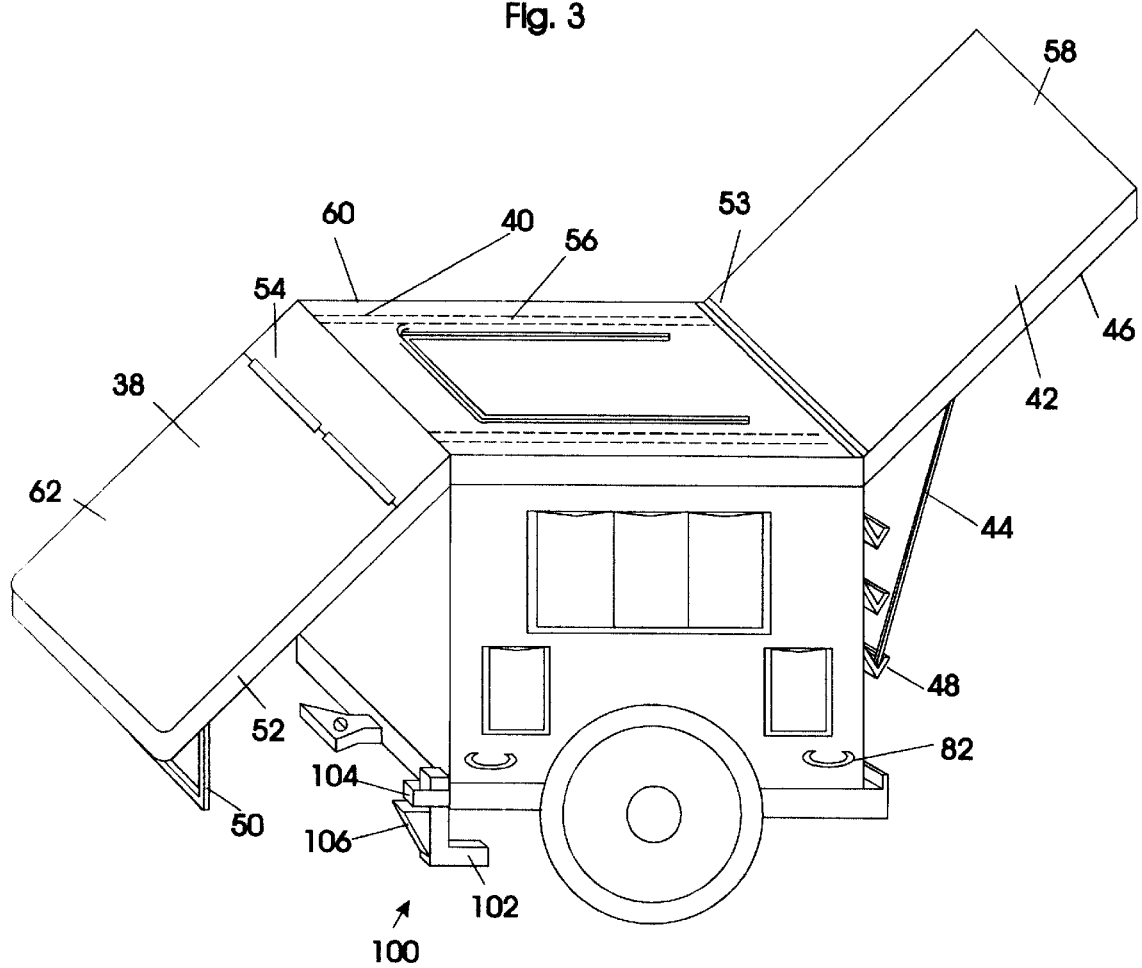
FIG. 4a is a perspective view of a first embodiment for the lid assembly of a portion of the multi-purpose cart apparatus of the present invention in an extended position for use as a chair.

The container body 32 has a hollow interior area that defines a storage area. This storage area is accessible via a lid. The lid can be a conventional lid or optionally, can include a lid assembly 36, as seen in FIG. 4a. This lid assembly 36 can be located on just one or both of the container bodies. This lid assembly, as shown in FIG. 4a, is designed and configured to act as a chair when in an extended position. There are two embodiments that have been used to produce favorable results. The first embodiment is shown in FIG. 4a. As seen the lid assembly comprises a front member 38 hingedly secured to a middle member 40. A rear member 42 is hingedly secured to the middle member 40 and oppositely from the front member. The rear member 42 folds rearwardly from the middle member 40. This rear member 42 is supported via support brace 44. As seen, the support brace 44 is pivotally secured in proximity to a lower end of the rear surface 46 of the rear member 42. Optionally, secured along the rear side of the portion having the lid assembly 36a is a plurality of hook members 48. These hook members 48 will receive the support brace 44 for locking the rear member in a secured position. Placing the support brace towards the lower hook members 48 will provide more of an incline while placing the support brace towards the top hook members 48 will provide less of an incline. Thereby, this pivotally attached brace 44 provides an inherent angular adjustment means.

In the second embodiment, as seen in FIG. 46, leg supports 51 are hinged to the lower surface of each section that will be converted to a chair. The leg supports will be secured at the lower surface on both the front and rear of each section. This will provide for the leg support to provide extra assurance that the chair will be in a fixed and secured position when utilized.

In addition, in this embodiment the rear member 42 is hingedly secured to the middle member 40 via a hinge 53, such as a piano hinge, that is capable of supporting an individual when in the extended position, as illustrated. In this configuration the brace and hooks are eliminated and thus provide for the rear of the section to include pockets and/or a logo.

In both embodiments, the front member 38, which is optional, and if provided will fold downwardly. A stand 50 is pivotally secured to this front member and offers additional structural support. As seen in FIG. 4a, the stand 50 is located on a lower surface 52 of the front member 38 when the lid assembly is in an extended position. In addition, to compensate for the thickness of the rear member 42, a hinged segment 54 is provided. This hinged segment will allow for the front member 38 to fold over the rear member 42.

When a lid assembly 36 is provided, an access means for accessing the interior area of the container body is located in the middle member 40. This access means can be a zipper, as illustrated, a conventional lid mechanism or the like. A zipper is ideally suited for a light weight material. If the material is light weight, then supports 56 can be interiorly located, as shown in outline for added structural strength.

In the compacted and transportable position, the lid assembly 36a will have the front surface 58 of the rear member 42 contact the upper surface 60 of the middle member 40. The hinged segment 54 of the front member 38 will contact the side edge of the rear member 42. The upper surface 62 of the front member 38 will contact the rear surface 46 of the rear member 42. This transportable position and foldable position is illustrated in FIG. 1.

In the extended position, the front member 38 is removed from the rear member 42. The stand is pivoted down so as to contact the ground or the like. This will provide for the front member 38 to be in a locked position. The rear member 42 is then lifted and extended rearward. The rear member is locked into place, dependent upon the embodiment provided. Once in an extended position, the combination of the front and rear members will provide for a lounge-like structure and a more comfortable and desirable chair.

Figure 4B:
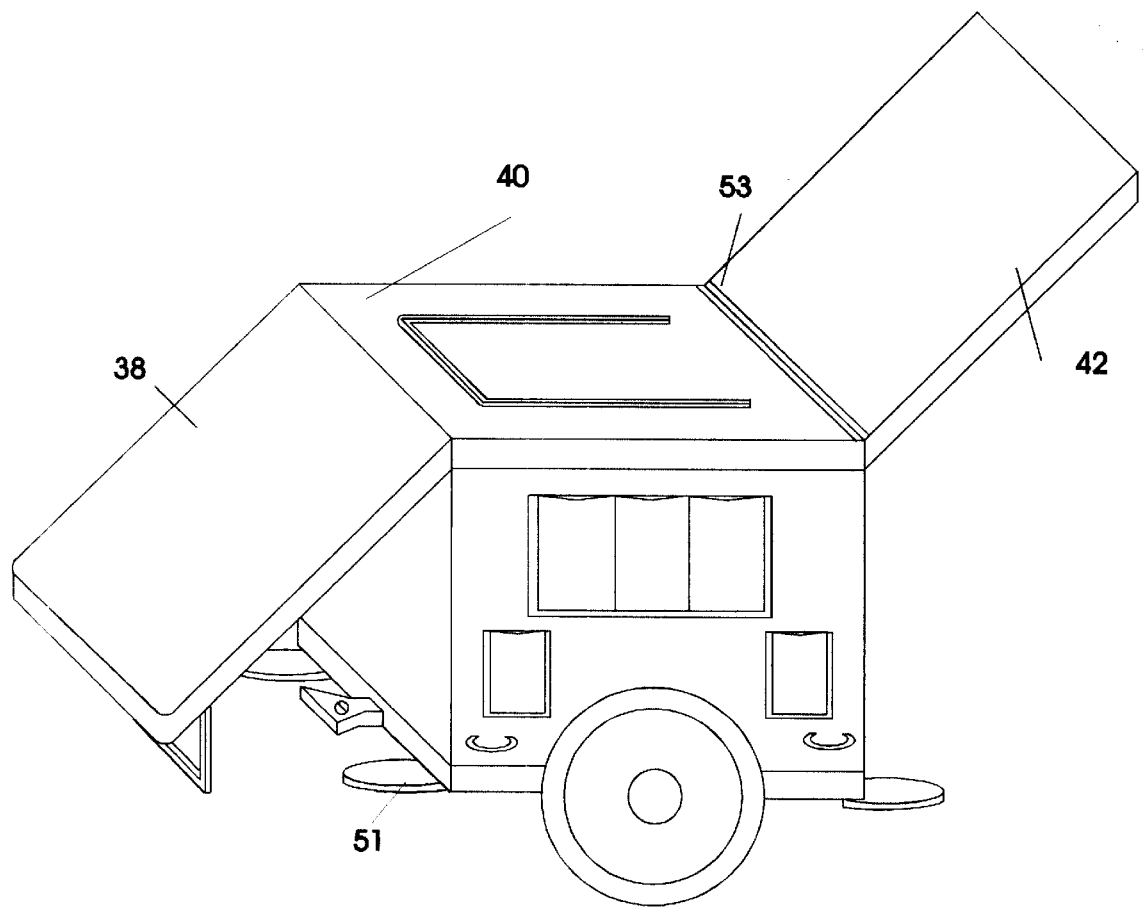
FIG. 4b is a perspective view of a second embodiment for the lid assembly of a portion of the multi-purpose cart apparatus of the present invention in an extended position for use as a chair.
Figure 5:
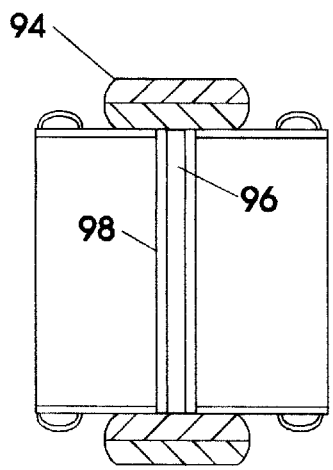
FIG. 5 is a bottom planar view of a portion of the multi-purpose cart apparatus of the present invention.

Alternatively, the segment 54 can be eliminated to provide for a different structure for the lid assembly of the present invention. This altered structure is illustrated in FIG. 4b. In this embodiment the chair would have basically the same features and characteristics as the first embodiment, except, as seen in this figure, the front member 38 includes a width which is slightly smaller in size than the width of the rear member 42. This arrangement is ideally suited for a lid assembly 36b having a frame member (illustrated in outline, but not labeled). Secured to the frame member is a light weight material, such as canvas or nylon. Having a slightly different width will allow for the front member 38 to be placed inside the rear member 42 when folded and in the transportable position.

It is noted that FIGS. 4a and 4b illustrate examples of a design which can be used for the front and rear members of the chair. It is to be understood that these members can be altered in structure and designed, by one of ordinary skill in the art, so as to provide a final product without departing from the scope of the present invention. The structure of these portion, the angular adjustments and their attachment to the middle can be accomplished via any numerous manner, as is known in the field of recreational outdoor lounge chairs.

Figure 7:
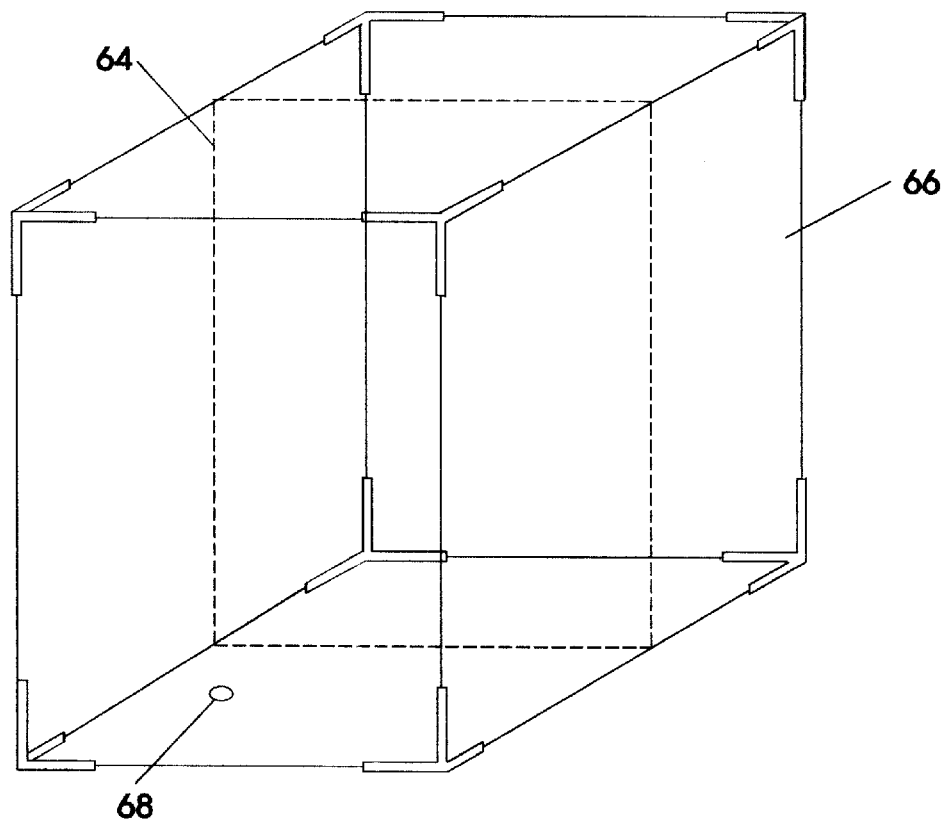
FIG. 7 is a perspective view of the interior area of the container body used with the multi-purpose cart apparatus of the present invention.
Figure 8:
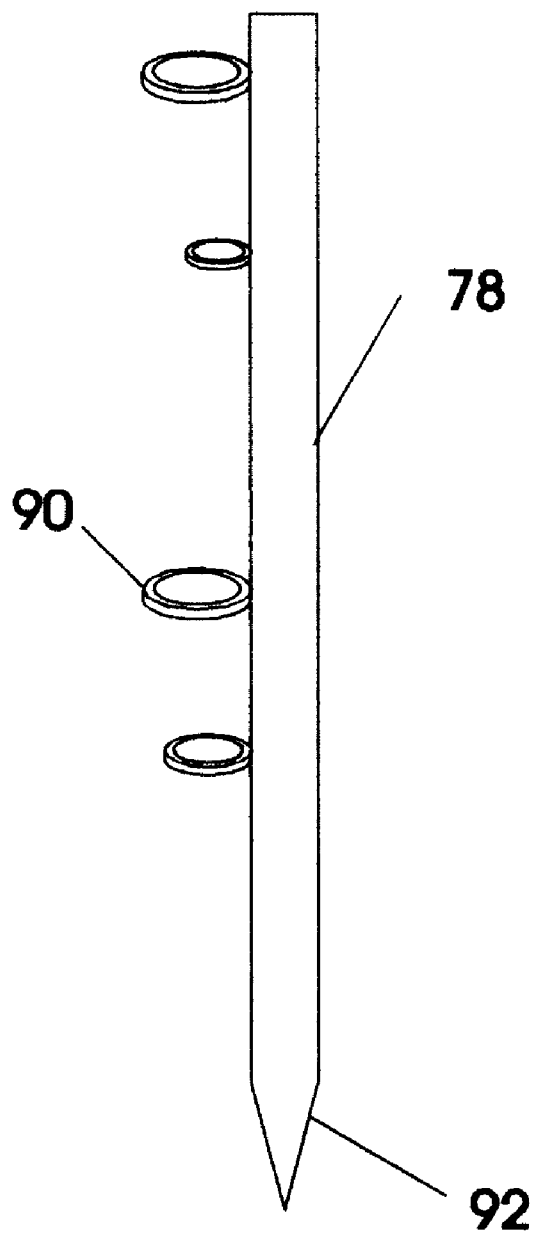
FIG. 8 is a side view of the handle used with the multi-purpose cart apparatus of the present invention.

Both or one of the container bodies 32 can be fabricated from material possessing insulating properties, so as to enable at least one compartment or preferably both to act as a cooler. As seen in FIG. 7, dividers 64, or the like, can be interiorly located so as to provide for an interior area 66, which includes various sections. Optionally, these dividers can be adjustable so as to provide for customized storage compartment geared towards the user's need. Hence, these containers 32 can also be used for dry storage as well as for items needing insulation. For insulation purposes, the container body must be fabricated from insulating material. For dry storage, the container body can be either fabricated from non-insulating material, insulating material, or the like.

For easy cleaning of the interior area 66 as seen in FIG. 7, one or both of the container bodies include a plugable drain opening 68. The plugable drain opening is a conventional element well known in the art and as seen includes an opening having a removable plug device attached thereto. This plugable drain opening 68 is aligned with holes 70 of the chassis section of the first and second sections, 12 and 14, respectively.

To enhance the multi-purpose cart 10 of the present invention, a plurality of pockets 72, as seen in FIGS. 1, 2 and 4, are provided. These pockets 72 can be located on any one and on as many side walls, of one or each portion, so as to add extra storage for miscellaneous and small items. The pockets are conventional items which can be of any size or shape, as deemed appropriate for its intended and particular use.

Holding means 82, specifically designed for elongated items or shafts, such as an umbrella, fishing rods, or the like, can be located along the sides of each compartment for adequately transporting and storing these awkward items. The holding means 82 can also act as tie downs for enabling items to be placed on the top of the container for transport and secured via rope, bungee cord, by-way-of the holding means or the like.

Figure 6:
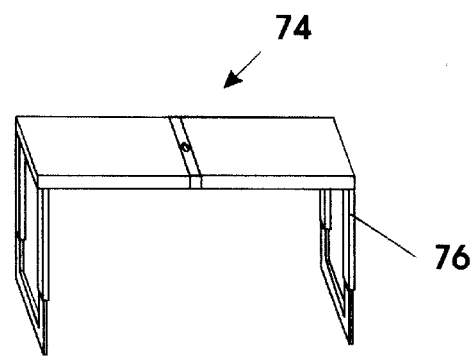
FIG. 6 is a perspective view of the collapsible table of the multi-purpose cart apparatus of the present invention.

Sandwiched between the first and second portions is the center section. This arrangement provides for a gap to be located between the first and second portions. The chassis 18b, illustrated in FIGS. 2 and 10, of the middle portion 16 provides a natural platform for storing narrow items, such as umbrella, floats, blankets, towels, or the like. One item, which has been stored therebetween, as seen in FIGS. 1, 2, and 6 and has produced favorable results, is a foldable table 74. The table 74 includes foldable legs 76, which are telescopic in structure, so as to provide for a final product which is completely compact and efficient. The use of telescopic legs 76 enables the user to select the desired height when utilizing the table. To provide for a more compact structure, the center of the table is foldable. For further enhancement the unit, an aperture (illustrated, but not labeled) can be located through the top surface of the table. The aperture is designed to accept an umbrella or the like.

To further assists the user, as seen in FIGS. 1, 2, 3, and 8, a handle 78 is either permanently secured, or optionally, removably secured to the first section of the apparatus of the present invention. This will permit conventional utility of the cart and allow the user to easily and efficiently push or pull the apparatus of the present invention when used as a cart.

Figure 11:
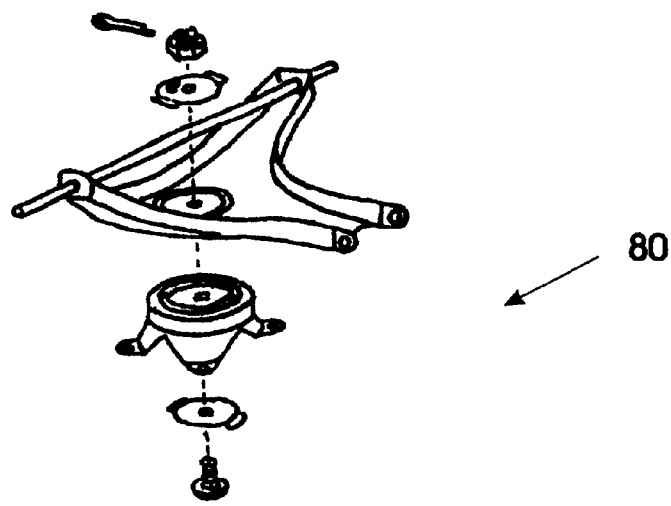
FIG. 11 is a perspective view of a steering assembly of the multi-purpose cart apparatus of the present invention.
Figure 12:
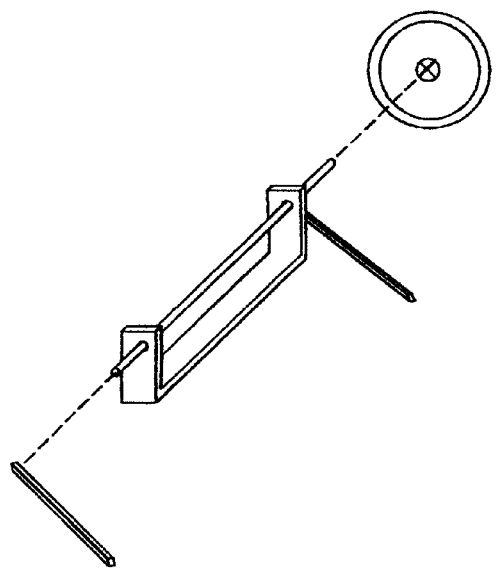
FIG. 12 is a perspective view of a wheel assembly of the multi-purpose cart apparatus of the present invention.

For manipulating the apparatus, coupling the handle to the chassis is a steering column 80. This steering column 80 is illustrated in FIG. 11. This steering column is conventional and includes conventional rotating mechanism for allowing the handle to turn easily and efficiently for adequate steering.

In the removable embodiment, the side of the handle can include a plurality of circular members 90 which can be individually used as drink holders. In this arrangement, the lower tip 92 of the handle 78 can be tapered. This lower tip is inserted into the ground for providing the handle to be in an upright position. Once in this position, the circular members are used. These circular members can also include conventional diameter adjusting means for adjusting the diameter of the circular member for accepting any size cup, bottle or can.

Tires 94 are used for allowing the cart apparatus of the present invention to be transported to a desired location. The tires 94 are designed and configured to travel easily, efficiently, and effortlessly through rough terrain, such as sand, mud, grass or the like. In order to accomplish this, the tires are fabricated from a sturdy material, such as plastic, and are riveted for rough terrain. As can be seen, the tires include a substantially wide width, to aid in transportation of the apparatus through rough terrain.

The axles 96 of the tire assembly can be secured to the chassis of the first and second portions 12 and 14, respectively or extend through an edge of the chassis of the first and second portions. In this arrangement the storage containers can include a groove 98, as seen in FIG. 7, so as to enable the axle to rotate and be free of an obstructions.

Safety features can also be included with the cart assembly of the present invention. One of the features is that the wheels can include brakes for securing and locking the cart assembly in a fixed position. A second feature can be the use of a stabilizer 100 illustrated in FIG. 4a. This stabilizer acts as a brake to prevent accidental movement of the cart assembly. As seen in this figure, the stabilizer is a stand 102 that is slidably mounted within a sleeve 104. The sleeve is secured either to the first member, second member or both the first and second member. A spring loaded button 106 is secured to the stand. In this configuration, the button is depressed to enable passage through the sleeve. When the button is located above the sleeve, the stand is up and above ground to enable the assemble to move. When the button is located below the sleeve the stand is lowered to provide for the stand to contact the ground. This position prevents the cart from moving.

Optionally, and as seen in FIG. 4c, the leg supports can be used. These leg supports 51 are ideal for use in the sand or in similar types of terrain.

While the invention has been particularly shown and described with reference to an embodiment thereof, it will be understood by those skilled in the art that various changes in form and detail may be made without departing from the spirit and scope of the invention.

I claim:

1. A convertible multi-purpose cart system comprising:

first and second body sections having hollow interiors for storing articles therein, a coupling mechanism for releasably connecting a rearward end of the first body section to a forward end of the second body section, a folded table positioned between the body sections when connected together, each body section includes a single pair of wheels rotatably attached to respective lateral sides thereof, a lid apparatus formed by first and second planar support members, said first planar support member includes a first portion hingedly secured to a forward top edge of said body section and a second portion hingedly secured to said first portion, said second planar support member being hingedly secured to a rearward top edge of said body section, a first support brace for maintaining said first planar support member in a position extending forwardly and downwardly from said forward edge of the body section to form a leg rest, a second support brace for maintaining said second planar support member in a position extending rearwardly from said rearward edge of the body section to form a backrest, and a ground engageable support for maintaining a top surface of the body section in a substantially horizontal alignment when the first and second body sections are disconnected, wherein the first and second planar support members are pivotable to a collapsed position with the second planar support member resting above a top surface of the body section, the first portion of the first planar support member extending vertically from the forward edge, and the second portion of the first planar support member resting above the second planar support member.

2. A multi-purpose cart as in claim 1 wherein at least one body section is fabricated from a material possessing insulating properties for enabling said at least one body section to act as a cooler.

3. A multi-purpose cart as in claim 2 wherein a plugable drain port is located within said at least one body section that is fabricated from said insulating material for enabling said hollow interior to be drained and cleaned.

4. A multi-purpose cart as in claim 1 wherein each body section includes a plurality of pockets exteriorly located.

5. A multi-purpose cart as in claim 1 wherein said wheels include a brake system.

6. A multi-purpose cart as in claim 1 wherein a handle is secured to said first section.

7. A multi-purpose cart as in claim 6 wherein said handle is removably secured to said first section, said handle includes a plurality of loops secured thereon for supporting beverage containers.

8. A multi-purpose cart as in claim 1 wherein said folded table includes legs that are telescopic so as to provide for a table that can be adjusted in height.

9. A multi-purpose cart as in claim 1 wherein a plurality of hooks are exteriorly located along a side of said first body section and said second body section, said hooks being located on the same side and are aligned with each other for permitting said hooks to accepted elongated and awkward objects.

* * * * *